Figure 1:
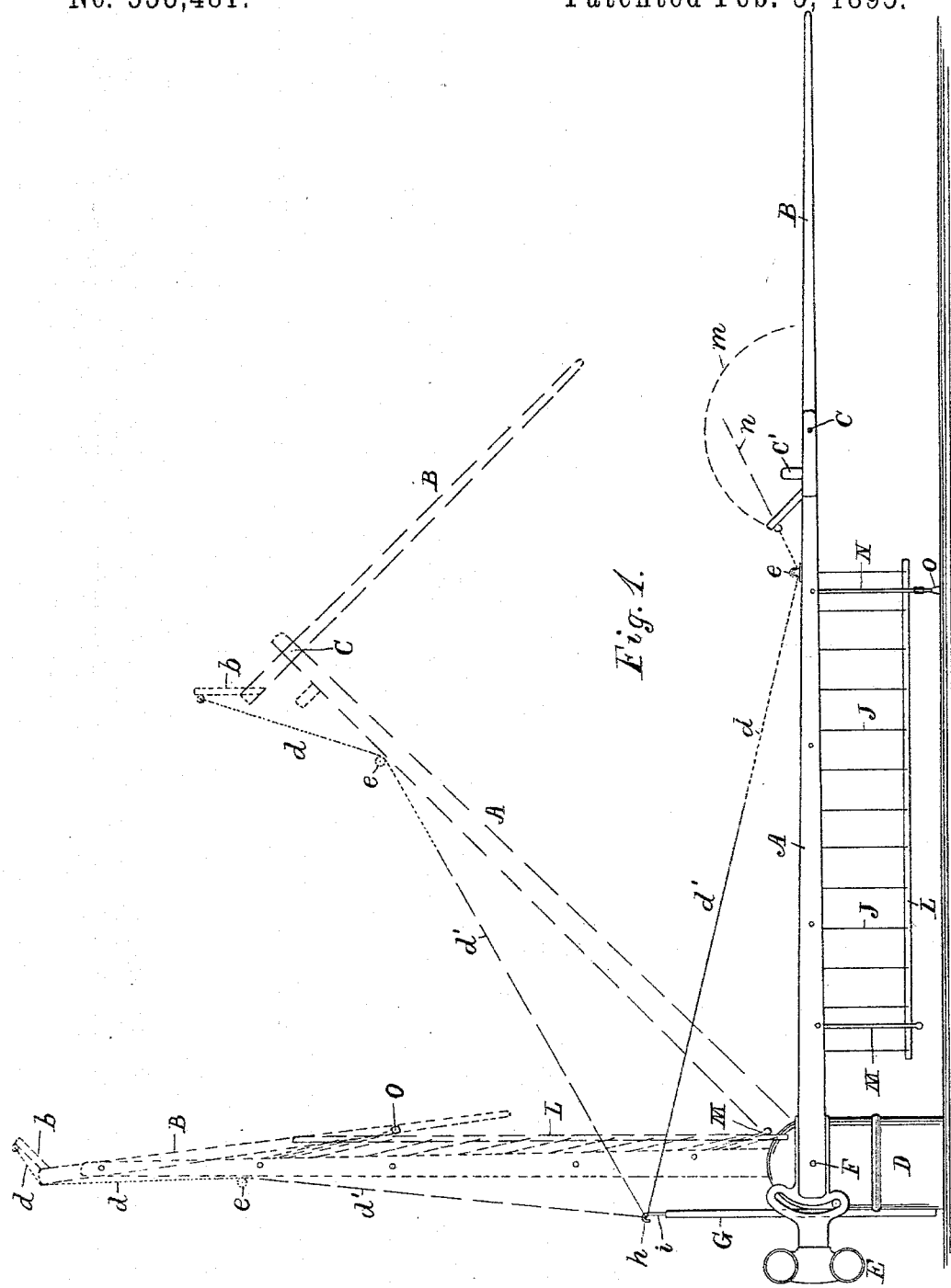

(No Model.) 2 Sheets—Sheet 2.
G. W. MERSHON.
GATE FOR RAILROAD CROSSINGS.
No. 533,481. Patented Feb. 5, 1895.
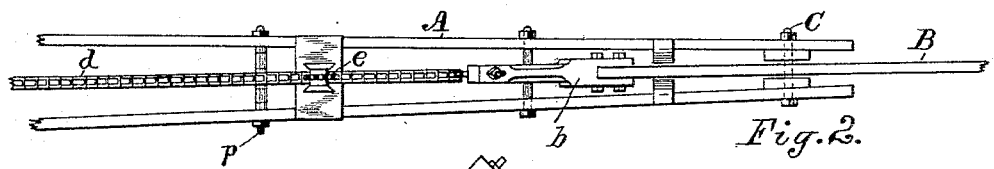
Fig. 2.
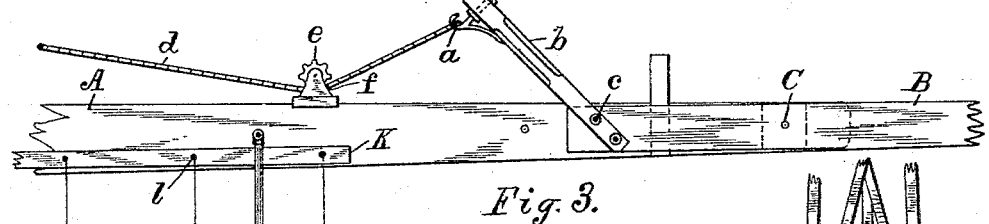
Fig. 3.
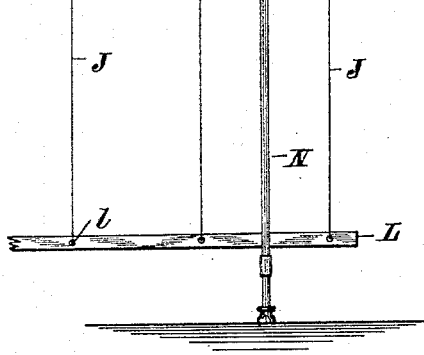
Fig. 4. Fig. 5.
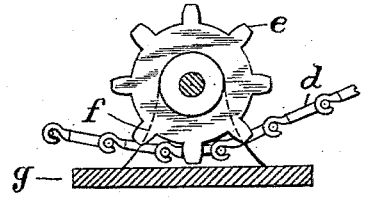
Fig. 6.
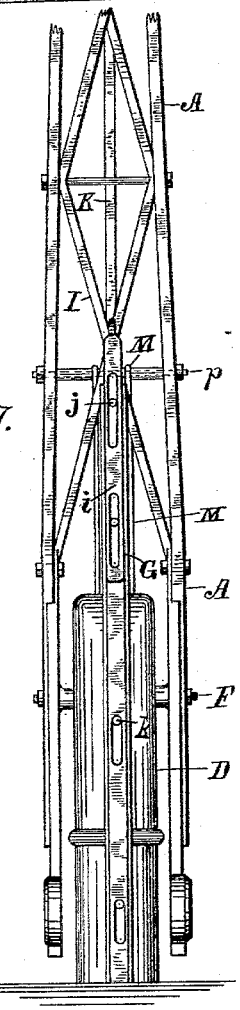
Fig. 7.
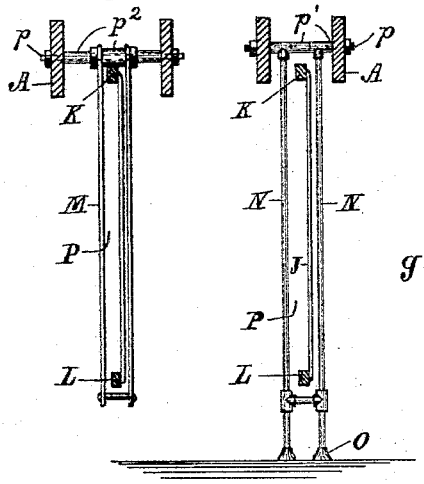
Attest:
J. Marx
Edw. F. Kinsey
Inventor.
George W. Mershon, per
Thos. S. Crane, Atty.

UNITED STATES PATENT OFFICE.

GEORGE W. MERSHON, OF NEWARK, NEW JERSEY.

GATE FOR RAILROAD-CROSSINGS.

SPECIFICATION forming part of Letters Patent No. 533,481, dated February 5, 1895.

Application filed September 1, 1894. Serial No. 521,910. (No model.)

*To all whom it may concern:*

Be it known that I, GEORGE W. MERSHON, a citizen of the United States, residing at Newark, Essex county, New Jersey, have invented certain new and useful Improvements in Gates for Railroad-Crossings, fully described and represented in the following specification and the accompanying drawings, forming a part of the same.

The object of this invention is to furnish an improved means of actuating an auxiliary arm upon a pivoted railway-crossing gate, and to provide means for bracing laterally a screen of rods pivoted to such gate.

Heretofore the supplemental arm in such gates has been extended, in its normal position, by a chain or wire stretched over a sheave-pulley, and capable of dropping from such pulley, if slackened. The weight of such a pulley requires a counterbalance of much greater weight at the opposite side of the fulcrum, and I therefore replace the pulley, by a small sprocket-wheel, and substitute a link belt for the cable chains and wires heretofore used. The main arm of such pivoted gates is commonly made of two boards, between the ends of which the supplemental arm is pivoted. To avoid placing the sprocket-wheel between the side bars or boards of the main arm, where it would be comparatively inaccessible, I mount the same upon a bearing upon the top of the arm and offset the working end of the supplemental arm, to which the chain is connected, to secure a proper angle between the chain and the end of the supplemental arm.

A shield is fixed tangential to the teeth of the sprocket-wheel, to keep the link belt in engagement therewith, and the support for the fixed end of the link belt is made adjustable in relation to the fulcrum of the gate so as to adjust the movement and position of the supplemental arm.

A screen may be applied to the gate, over a cross-walk, to prevent foot passengers from creeping under the gate, and the screen is formed with a continuous bar at the lower edge, which is braced laterally by hinged guides pivoted between the side bars of the gate. When furnished with such lateral support, the screen may be made exceedingly light and with less strength than would otherwise be required.

The construction will be understood by reference to the annexed drawings, in which—

Figure 1 is a side elevation of the gate, which is shown in full lines in a horizontal position, and in two other positions in dotted lines. Fig. 2 is a plan of the parts adjacent to the sprocket-wheel upon a much larger scale. Fig. 3 is a side elevation of the same. Fig. 4 is a transverse section of the main arm of the gate with one of the pivoted guides for the screen. Fig. 5 is a similar section with one of the gate-rests modified to form a lateral guide; and Fig. 6 is a side elevation of the sprocket-wheel, with its bearing and shield in section at the edge of the wheel. Fig. 7 shows the inner end of the gate, erected upon its gearing-box.

A are the side bars of the main gate arm, and B the supplemental arm jointed near the outer ends of the same upon a pivot bolt C. The arm B extends inward past the pivot for attachment to the link belt, which moves the arm, and the working end of the arm is offset by attaching a piece $b$ at an angle therewith. Such piece is shown in Figs. 2 and 3 secured by bolts $c$, and the piece is provided with a hook $a$ upon which the end of the link belt $d$ is secured.

At a suitable distance from the hook $a$, the sprocket-wheel $e$ is mounted, in a bearing $f$, upon the top of the bars A. The bearing is formed with a plate $g$ extending across the periphery of the sprocket-wheel in close proximity to the sprocket-teeth; such plate serving as a shield or guard, to hold the link belt constantly upon the teeth, as the wheel revolves. The main gate arm is shown pivoted as usual upon the gearing-box D, and counterbalanced by weights E.

The fixed bearing for the link belt is formed by attaching a post G to one side of the box D and providing the same at its upper end with a hook $h$. As the relative lengths of the arms A and B vary with the span of the railway crossing, the hook $h$ requires, in different gates, to be set at different distances from the fulcrum F upon which the arm A is turned. To permit such variation, in the height of the hook $h$, I form the same as shown in Fig. 7, with a slotted foot $i$ secured by bolts $j$ to the post G. Slots $k$ are also shown for the connection of the post to the gearing-box D; and either or both of such means may be used for extending the hook $h$ to a proper height.

The post G is shown in Figs. 1 and 7 formed of a channel bar with the foot of the hook fitted between its lateral flanges, but any other form of connection may be used.

In Fig. 7 a portion of the diagonal framing I is shown, which is commonly used to brace the side bars $j$; and a longitudinal strip K is shown, in Figs. 4, 5 and 7 attached to such bracing to sustain the screen.

Light metal rods J are pivoted by screws or rivets $l$ to such strip, and also to a parallel bar L which forms the lower edge of the screen. The pivots $l$ permit the bar L to hang parallel with the main bars A in all positions of the gate. Such movement of the screen is indicated in dotted lines in Fig. 1. As such screen has no lateral strength I support or brace the bar L by lateral guides M and N.

The screen guides, as shown in the drawings, are formed each of two rods pivoted at the upper end by a transverse bolt $p$ to the gate arm A, and extended downward one at each side of the bar L. The rods are tied together below the bar L and serve to support the same against lateral pressure upon either side; while they permit the bar L to turn freely upon the rods J as the gate is raised. The bolts $p$ are shown arranged above the level of the pivots $l$; for which reason the bar L is permitted to play in the slot P; but if desired the screen guide may be hinged upon a line with the pivots $l$, and the screen guide could then be fastened rigidly to the bar L. The guide M is shown of merely sufficient strength to support the screen, as required; but the guide N is shown as a modification of the rest which is commonly used to come in contact with the ground or pavement when the gate is horizontal. Such modification consists in forming the rest with two legs instead of one, and extending them downward below the bar L, to reach the ground as required, the legs being tied below the bar, like the legs M.

It will be noticed that the guide N is formed of pipes and fittings, the upper ends of the two rods being formed of T-pipes which turn loosely upon the bolt $p$, and are held in place thereon by loosely fitting collars $p'$ formed of suitable pieces of pipe. The guide may, however, be attached rigidly to the bolt, and the latter arranged to turn in the side bars A, as such construction gives a broader base to the guide, and makes it stiffer against lateral pressure. The same result is effected by attaching the rods of the guide to a sleeve, as shown in Fig. 4, where the sleeve is constructed to turn loosely upon the bolt, and the rods of the guide are clamped against an enlarged portion upon the middle of the sleeve $p^2$. I find in practice that the two rods of the guide when tied securely at the bottom and arranged to turn upon the bolt $p$, furnish the desired support for the gate, and add less weight to the gate than any other form of construction. Every ounce added to the gate involves the addition of a pound or more to the counterbalance E, which the operator is compelled to move with the gate; and the lightening of the entire construction greatly diminishes the time and labor required in moving the gate. To secure lightness, the off-set piece $b$ is preferably made of wood, as shown in Figs. 2 and 3, and may, by suitably notching the extension piece and arm together, be secured upon the supplemental arm by a single bolt, thus still further diminishing the weight.

With the use of a guard $g$ adjacent to the sprocket-wheel, as shown in Fig. 6, the link-belt $d$ is prevented in all cases from slipping from the teeth of the wheel. The wheel may therefore be made very small, as shown in Figs. 1 and 3, and the construction made of very much less weight than any kind of sheave pulley which must be provided with flanges to hold the chain in place.

The link-belt may be employed only where the flexible connection between the post G and the arm B moves in contact with the sprocket-wheel, and a wire, cord, or other suitable means may be used for attaching the link belt to the post. A wire connection for the link-belt is shown in Fig. 1, where the belt $d$ is shown attached by a wire $d'$ to the hook $h$ at the top of the post.

Owing to the smallness of the scale in Fig. 1, the wire $d'$ is represented by a black line merely, and the link-belt chain by a fine dotted line. Where the gate is shown in dotted lines in Fig. 1, the wire is represented by a broken line and the link belt by a fine dotted line. I have found in practice that with a gate having a supplemental arm moved by a link-belt running over a sprocket-wheel the operator is enabled to raise and lower the gate more steadily, and with fewer jerks and vibrations than where a chain running over a sheave-pulley is used for the same purpose. The arrangement of the sprocket-wheel and its bearing upon the top of the main arm A necessitates the use of an off-set piece $b$ upon the supplemental arm, but the use of such offset piece is a material advantage, as it may be arranged at such an angle as to afford a much greater leverage to the chain than where it is attached directly to the inner or working end of the supplemental arm. Such advantage is illustrated in Fig. 1 by the relation of the semi-circle $m$ (drawn concentric with the pivot C) to the straight line $n$ which represents the direction of the link-belt when holding the arm B horizontal, and also in the relation of the link-belt to the pivot C upon the arm A where the latter is drawn in its intermediate position. The off-set piece in these views is set at an angle of forty-five degrees to the supplemental arm, and affords a strong leverage for the link belt in moving the supplemental arm to its horizontal position as the main arm is lowered.

The usual sloping cheek pieces C' are shown adjacent to the pivot C to steady the inner end of the supplemental arm; but these, as well as the screen with bar L at the bottom, have already been used and form no part of my present invention.

Having thus set forth the nature of the invention, what is claimed herein is—

1. A railway crossing gate comprising the main arm A having the sprocket-wheel $e$ mounted thereon with adjacent guard $g$, the supplemental arm B having the offset $b$ at its working end with link-belt attached thereto and extended beneath the sprocket-wheel, and a post fixed near the fulcrum of the gate with means for attaching the link-belt to the same, as and for the purpose set forth.

2. A railway crossing gate comprising the main arm A having the sprocket-wheel $e$ mounted thereon with adjacent guard $g$, the supplemental arm B having the offset $b$ at its working end with link-belt attached thereto and extended beneath the sprocket-wheel, and a post fixed upon the gearing-box D, and with hook $h$ supported adjustably thereon, as and for the purpose set forth.

3. In a railway gate, the combination, with the main arm of the gate, of a series of vertical rods J pivoted thereon, and provided with a bar L pivoted at their lower ends, and a guide of greater rigidity than the rods J pivoted in a corresponding manner and extended downward to the bar L, as and for the purpose set forth.

4. In a railway gate, the combination, with the main arm of the gate, of a series of vertical rods J pivoted thereon, and provided with a bar L pivoted at their lower ends, and a guide pivoted upon a bolt between the bars A and having two side bars with slot P to admit the bar L and support the same laterally, substantially as herein set forth.

5. In a railway gate, the combination, with the main arm of the gate, of a series of vertical rods J pivoted thereon, and provided with a bar L pivoted at their lower ends, and a rest pivoted between the bars A and having two side bars with slot P to admit the bar L, and having feet to rest upon the ground, substantially as herein set forth.

In testimony whereof I have hereunto set my hand in the presence of two subscribing witnesses.

GEORGE W. MERSHON.

Witnesses:
JOHN GOLDHAM,
THOMAS S. CRANE.